United States Patent
Jijina et al.

(10) Patent No.: US 6,904,141 B2
(45) Date of Patent: Jun. 7, 2005

(54) METHOD AND DEVICE FOR REMOTELY ROUTING A VOICE CALL

(75) Inventors: Jasmin Jijina, Novi, MI (US); John J. Correia, Livonia, MI (US); Ronald W. Fraser, Lake Orion, MI (US); William E. Mazzara, Jr., Drayton Plains, MI (US); Steven P. Schwinke, Plymouth, MI (US)

(73) Assignee: General Motors Corporation, Detroit, MI (US)

( * ) Notice: Subject to any disclaimer, the term of this patent is extended or adjusted under 35 U.S.C. 154(b) by 159 days.

(21) Appl. No.: 10/001,941

(22) Filed: Nov. 30, 2001

(65) Prior Publication Data

US 2003/0103599 A1 Jun. 5, 2003

(51) Int. Cl.[7] .............................................. H04M 3/42
(52) U.S. Cl. ............................. 379/211.02; 379/88.23; 379/211.02; 379/211.03; 379/211.04; 379/373.01; 455/417
(58) Field of Search ....................... 379/88.23, 373.01, 379/211.02, 211.03, 211.04, 211.01, 106.01, 156–158, 214.01, 212.01; 455/417, 552.1, 436.2; 377/211.05

(56) References Cited

U.S. PATENT DOCUMENTS

| | | | | |
|---|---|---|---|---|
| 5,197,092 A | * | 3/1993 | Bamburak | 379/211.05 |
| 5,369,695 A | * | 11/1994 | Chakravarti et al. | 379/211.02 |
| 5,375,161 A | * | 12/1994 | Fuller et al. | 455/417 |
| 5,487,111 A | * | 1/1996 | Slusky | 379/211.03 |
| 6,128,382 A | * | 10/2000 | Borland et al. | 379/373.01 |
| 6,192,254 B1 | * | 2/2001 | Carlsen et al. | 455/552.1 |
| 6,208,854 B1 | * | 3/2001 | Roberts et al. | 455/417 |
| 6,493,442 B1 | * | 12/2002 | Goldman et al. | 379/207.02 |
| 6,516,060 B1 | * | 2/2003 | Foladare et al. | 379/211.03 |

* cited by examiner

*Primary Examiner*—Scott L. Weaver
*Assistant Examiner*—Shafiul Alam Elahee
(74) *Attorney, Agent, or Firm*—Anthony Luke Simon

(57) ABSTRACT

A device for implementing a method of remotely routing a voice call forward to a telematic device is disclosed. The device first maintains a call state of the voice call in response to an answering of call forwarding rings by the telematic device. The device then forwards the calls to the next assigned device in response to a failure of a user of the telematic device to answer fake rings from the telematic device. Such a failure can be indicated by a monitoring of a prescribed number of back ring tones or a dropping of call within a prescribed timer window.

16 Claims, 5 Drawing Sheets

METHOD AND DEVICE FOR REMOTELY ROUTING A VOICE CALL

BACKGROUND OF THE INVENTION

1. Field of the Invention

The present invention generally relates to call forwarding methods. The present invention particularly relates to a remote routing of voice calls after an execution of a call forwarding method involving a telematic device.

2. Description of the Related Art

In FIG. 1, an exemplary operation of a prior art system involving telecommunication devices in the form of a business phone 10, a wireless network 20, and a portable phone 30 as well as a telematic device in the form of an embedded vehicle phone 40 within a vehicle 41 is shown. Portable phone 30 and the embedded vehicle phone 40 are owned by a subscriber. Vehicle phone 40 includes a conventional Vehicle Communication Unit ("VCU") operable to wake up at regular intervals in order to receive data calls. Additionally, vehicle phone 40 answers each in-coming call, voice or data, when an ignition of vehicle 41 is on or when the VCU is awake in a DRx cycle.

As known in the art, the wireless network 20 attempts to route a voice call from a caller of the business phone 10 to the portable phone 30 as symbolized by the in-coming rings and the system rings. In response to the in-coming rings, a call forwarding module 21 of the wireless network 20 as shown in FIG. 2 implements a known call forwarding method as represented by a flowchart 50 as shown in FIG. 3. Specifically, call forwarding module 21 establishes a call state of the voice call during a stage S54 of the flowchart 50 upon a detection of the in-coming rings during a stage S52 of flowchart 50. Thereafter, call forward module 21 transfers the voice call to a voice mail module 22 of wireless network 20 during a stage S66 of the flowchart 50 when wireless network 20 ascertains portable phone 30 is currently in use by the subscriber (or another user) during a stage S56 of flowchart 50.

Otherwise, call forwarding module 21 monitors the system rings provided to portable phone 30 by wireless network 20 during a stage S58 of flowchart 50 whereby call forwarding module 21 can take one of two actions. The first action is to terminate the call state of the voice call during a stage S68 of flowchart 50 and return to stage S52 when call forwarding module 21 ascertains during a stage S60 of flowchart 50 that the subscriber (or another user) answered the system rings within a prescribed period X. The second action is to provide and monitor call forward rings to vehicle phone 40 during a stage S62 of flowchart 50 when the call forwarding module 21 ascertains during stage S60 that the subscriber (or another user) failed to answer the system rings within a prescribed period X.

The vehicle phone 40 will answer the call forward rings from call forwarding module 21 when the ignition of vehicle 41 is on or when the VCU is awake in a DRx cycle. Accordingly, in the case of the second action, call forwarding module 21 will terminate the call state of the voice call during stage S68 and return to stage S52 when call forwarding module 21 ascertains during stage S64 that vehicle phone 40 answered the call forward rings within a prescribed period Y (i.e., the ignition of the vehicle 41 is on or the VCU is awake in a DRx cycle). Otherwise, call forwarding module 21 will transfer the voice call to voice mail module 22 and return to stage S52.

Upon an answering of the call forwarding ring, the vehicle phone 40 provides fake rings for the subscriber as well as associated ring back tones for the caller. As such, the subscriber (or another user) can answer the fake rings if present within the vehicle 41. A drawback to the prior art scenario is the termination of the call state by the call forwarding module 21 during stage S68 prohibits the call forwarding module 40 from transferring the voice call to voice mail module 22 upon a failure of the subscriber (or another user) to answer the fake rings. The present invention addresses this drawback.

SUMMARY OF THE INVENTION

The present invention relates to call forwarding method and system that overcomes the aforementioned disadvantages of the prior art. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is a first method for remotely routing a voice call forwarded to a first telematic device. First, a call state of the voice call is maintained in response to an answering by the first telematic device of one or more call forwarding rings indicative of the voice call. Second, the voice call is forwarded to either a voice mail module, a second telematic device or a telecommunication device in response to a failure of a user of the first telematic device to answer one or more fake rings indicative of the voice call.

A second form of the present invention is a second method for remotely routing a voice call forwarded to a first telematic device. First, a call state of the voice call is maintained in response to an answering by the first telematic device of one or more call forwarding rings indicative of the voice call. Second, ring back tones provided by the first telematic device in response to answering the one or more call forwarding rings are monitored. Finally, the voice call is forwarded to either a voice mail module, a second telematic device or a telecommunication device in response to a failure of a user of the first telematic device to answer one or more fake rings indicative of the voice call after a prescribed number of ring back tones.

A third form of the present invention is a third method for remotely routing a voice call forwarded to a first telematic device. First, a call state of the voice call is maintained in response to an answering by the first telematic device of one or more call forwarding rings indicative of the voice call. Second, a timer is initiated in response to the answering of the one or more call forwarding rings by the telematic device. Finally, the voice call is forwarded to either a voice mail module, a second telematic device or a telecommunication device in response to the first telematic device dropping the voice call within a prescribed timer window.

The foregoing forms, and other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
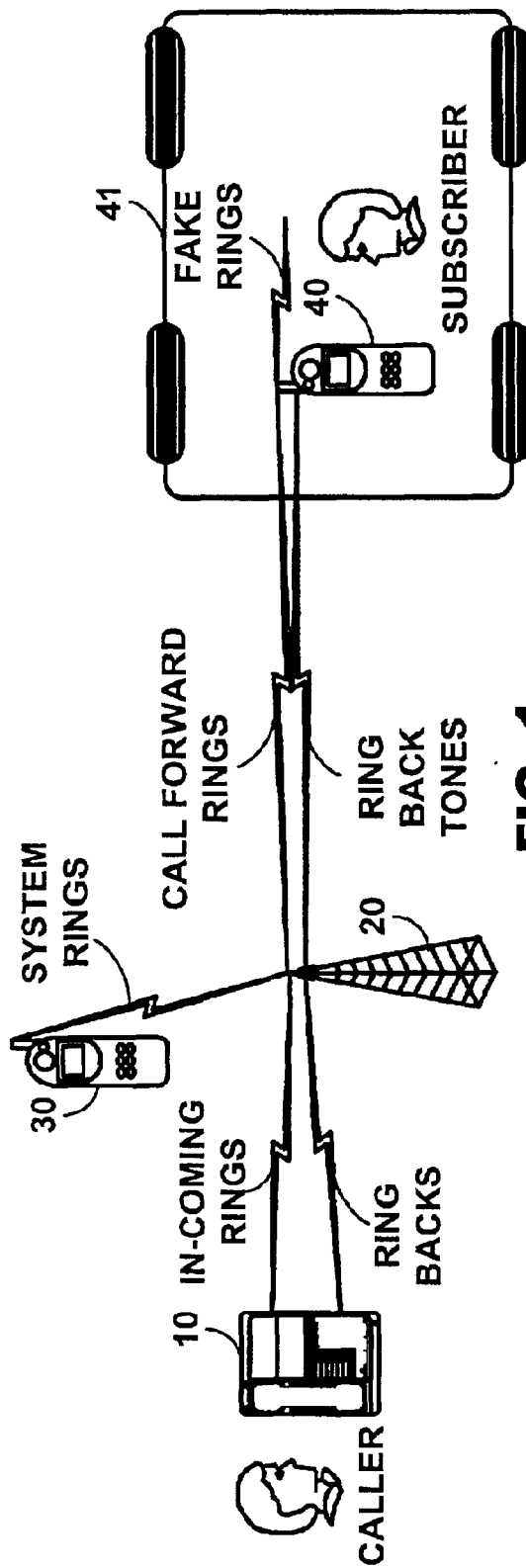
FIG. 1 is an illustration of system as known in the art.
Figure 2:
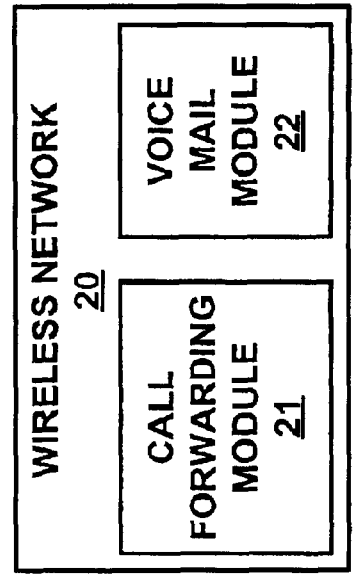
FIG. 2 is an illustration of wireless network as known in the art.
Figure 3:
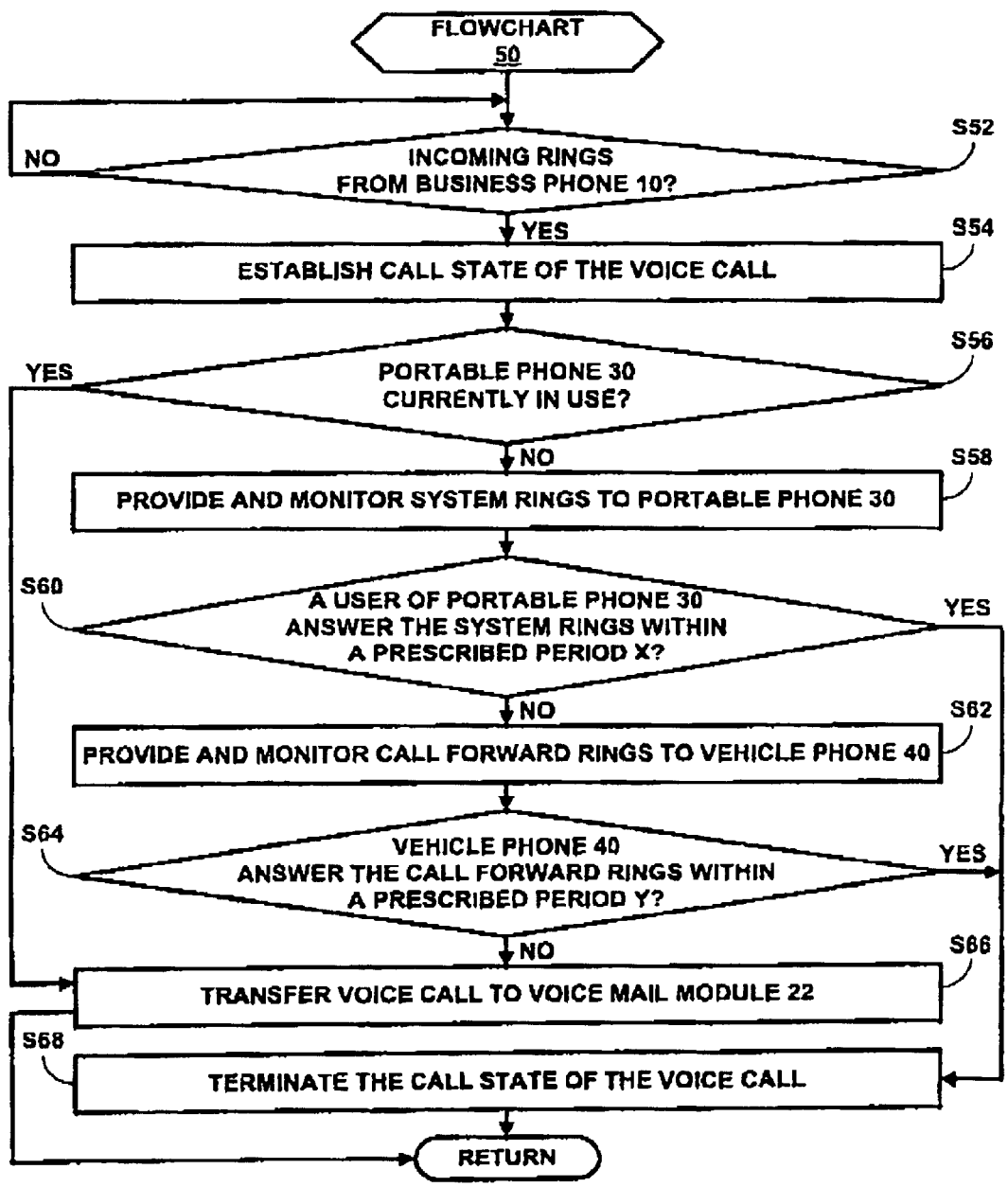
FIG. 3 is an illustration of a flow chart representative of call forwarding method as known in the art.
Figure 4:
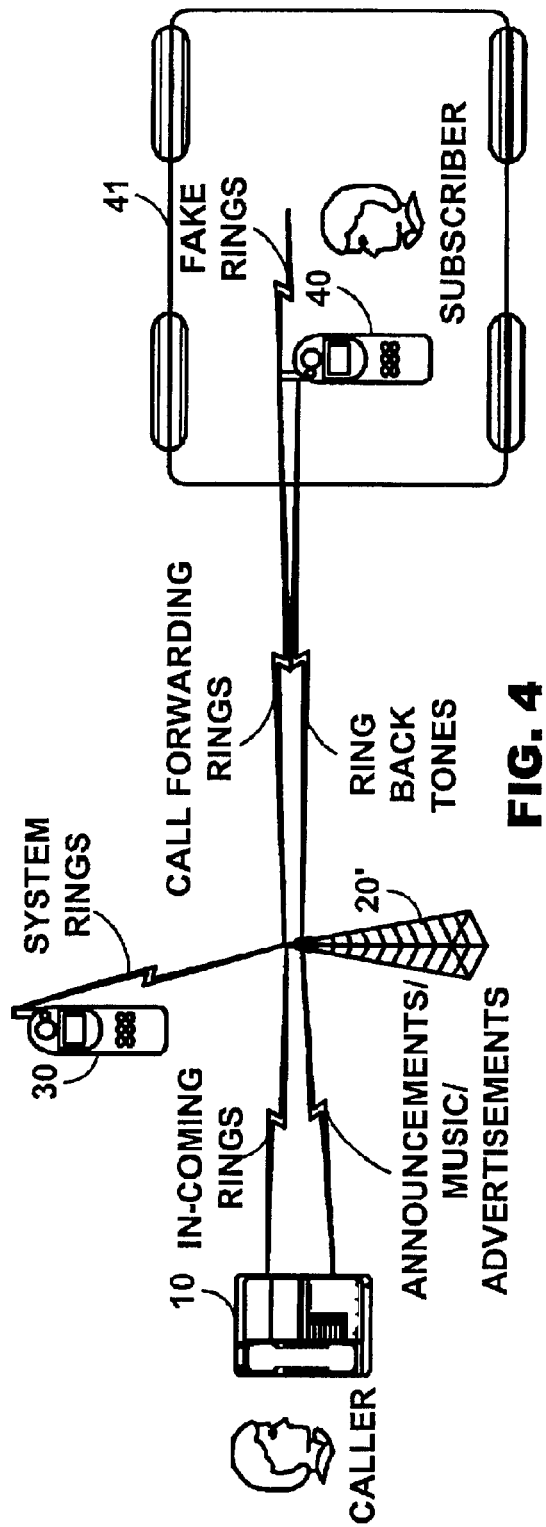
FIG. 4 is an illustration of one embodiment of a system in accordance with the present invention.
Figure 5:
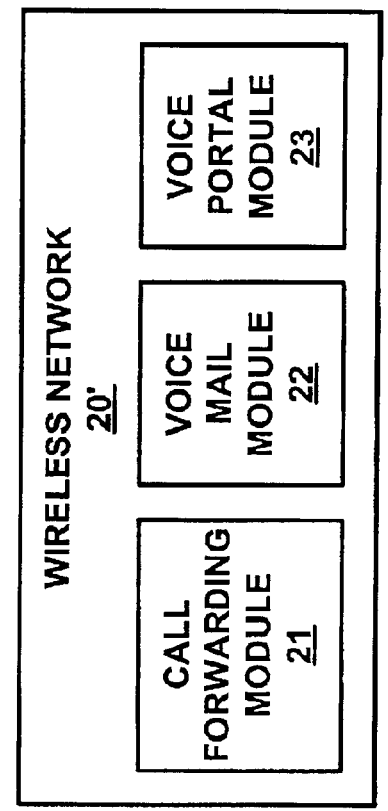
FIG. 5 is an illustration of one embodiment of a wireless network in accordance with the present invention.
Figure 6:
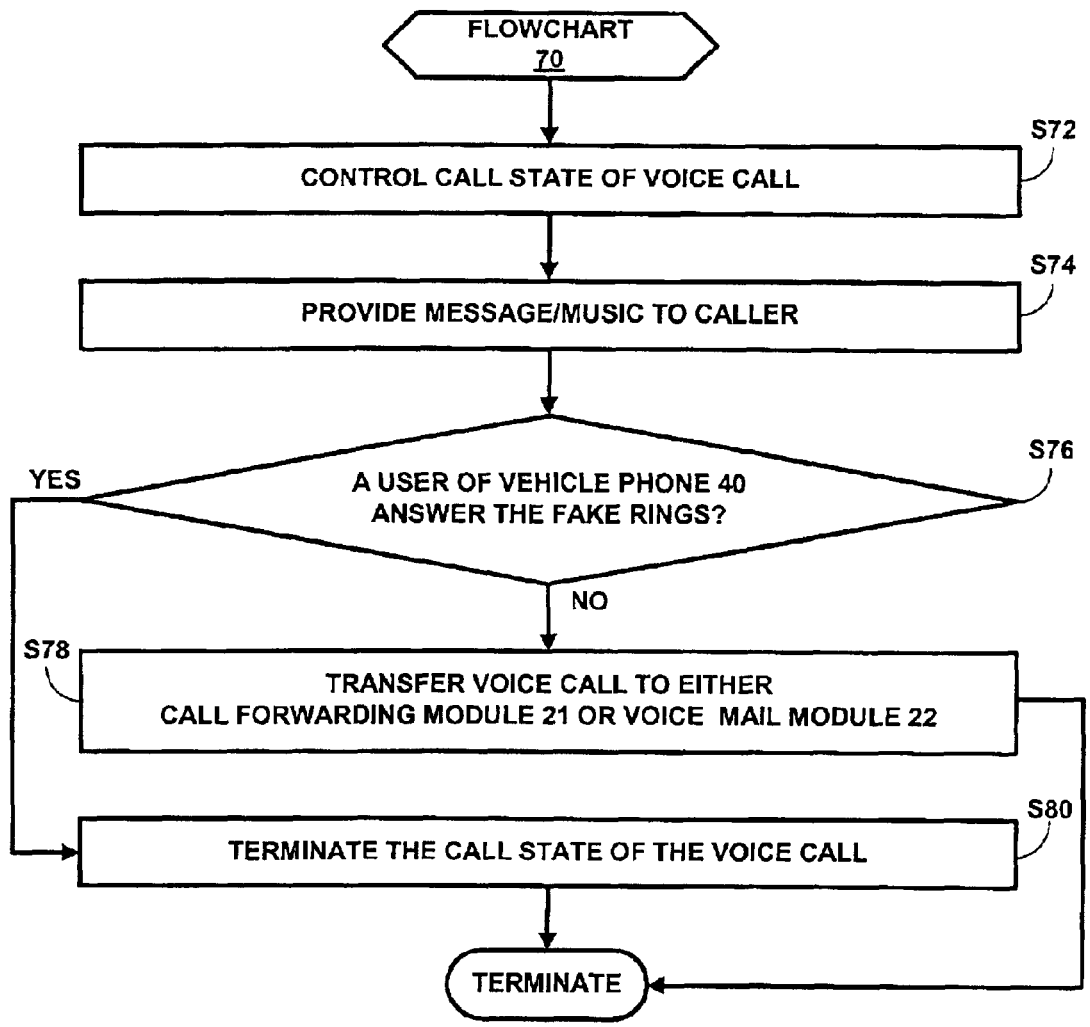
FIG. 6 is an illustration of a flow chart representative of one embodiment of a call forwarding method in accordance with the present invention.

In FIG. 4, an exemplary operation of one embodiment of a system in accordance with the present invention is shown. The system comprises business phone 10, portable phone 30, and vehicle phone 40 embedded within vehicle 41 as previously described in connection with FIG. 1. The system further includes a wireless network 20' as illustrated in FIG. 5. Wireless network 20' includes call forwarding module 21 and voice mail module 22 as previously described in connection with FIGS. 2 and 3. Additionally, wireless network 20' includes a new and unique voice portal module 23 to address the aforementioned drawback of call forwarding module 21. Specifically, voice portal module 23 performs stages S62-S66 of flowchart 50 (FIG. 3) and implements one embodiment of a remote routing method of the present invention in lieu of stage S68 (FIG. 3). A flowchart 70 illustrated in FIG. 6 is representative of the remote routing method.

During a stage S72 of the flowchart 70, voice portal module 23 controls the call state of the voice call whereby voice portal module 23 will maintain the call state of the voice call until a final resolution of the voice call (i.e., a forwarding of the voice call to voice mail module 22, a conversation between the caller and a user of vehicle phone 40, or a termination of the voice call by the caller or user of vehicle phone 40). In response to the ring back tones, voice portal module 23 sequentially proceeds to a stage S74 and a stage S76 of the flowchart 70. During stage S74, voice portal module 23 provides an announcement to the caller indicating the voice call has been forwarded to vehicle phone 40 and the possibility of waiting for a fixed number of rings before being forwarded to voice mail module 22. Upon completion of the announcement, voice portal module 23 can play music and/or run advertisements for the caller.

During stage S76, voice portal module 23 ascertains whether the subscriber (or another user) answered the fake rings. If so, voice portal module 23 proceeds to a stage S80 of the flowchart to terminate the call state of the voice call. Otherwise, voice portal module 23 proceeds to a stage S78 of the flowchart to transfer the voice call to voice mail module 22 whereby the caller can leave a message, or to transfer the voice call to call forwarding module 21 whereby call forwarding module 21 can call forward the voice call to another telecommunication device (e.g., a home phone, a business phone, or a second portable phone) or another telematic device (a second embedded vehicle phone having a VCU).

Figure 7:
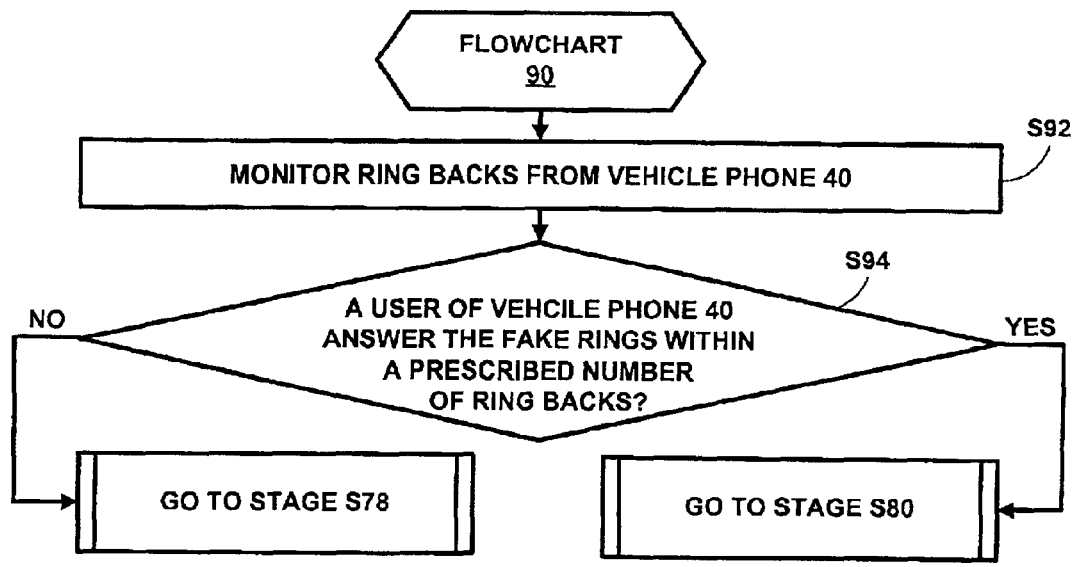
FIG. 7 is an illustration of a flow chart representative of a first embodiment of an answer detection method in accordance with the present invention.

In FIG. 7, a flowchart 90 representative of a first embodiment of an answer detection method of the present invention is shown. Flowchart 90 can be executed by voice portal module 23 during stage S76 (FIG. 6). During a stage S92 of flowchart 90, voice portal module 23 monitors the ring back tones from vehicle phone 40. Voice portal module 23 thereafter proceeds to a stage S94 of flowchart 90 to ascertain whether the fake rings were answered by the subscriber (or another user of vehicle phone 40) within a prescribed number of ring back tones (e.g., three or more ring back tones). In one embodiment, voice portal module 23 is operable to latch onto the frequency of the ring back tones and to distinguish other frequencies from the ring back tone frequency. Voice portal module 23 will proceed to stage S78 (FIG. 6) when voice portal module 23 counts an actual number of ring back tones that equals the prescribed number of ring back tones without hearing a different frequency other than the ring back tone frequency. Otherwise, voice portal module 23 proceeds to stage S80 (FIG. 6) when voice portal module 23 counts an actual number of ring back tones that is less than the prescribed number of ring back tones upon hearing a different frequency other than the ring back frequency.

Figure 8:
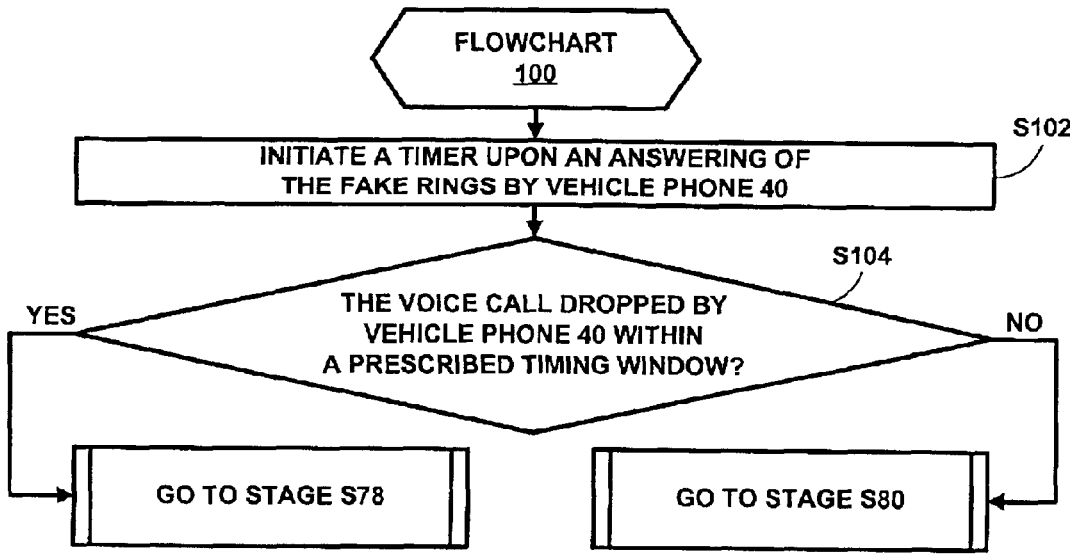
FIG. 8 is an illustration of a flow chart representative of a second embodiment of an answer detection method in accordance with the present invention.

In FIG. 8, a flowchart 100 representative of a second embodiment of an answer detection method of the present invention is shown. Flowchart 100 can be executed by voice portal module 23 during stage S76 (FIG. 6). During a stage S102 of flowchart 100, voice portal module 23 initiates a timer upon an answering of the fake rings by vehicle phone 40. Voice portal module 23 thereafter proceeds to a stage S104 of flowchart 100 to ascertain whether the voice call was dropped by vehicle phone 40 within a prescribed timing window which is defined by an amount of time for a prescribed number of fake rings±an epsilon $\epsilon$. Voice portal module 23 proceeds to stage S78 (FIG. 6) when a cumulative amount of time indicated by the timer upon a dropping of the voice call by vehicle phone 40 is within the prescribed timing window. Otherwise, voice portal module 23 proceeds to stage S80 (FIG. 6) when a cumulative amount of time indicated by the timer upon a dropping of the voice call by vehicle phone 40 is not within the prescribed timing window.

Each module of wireless network 20' as described herein may be implemented in hardware (analog or digital), software, or any combination of hardware and software. Additionally, other types of telecommunication devices and other types of telematic devices can be employed within alternative embodiments of the present invention. Further, voice portal module 23 can be located within devices other than a wireless network and/or incorporated within call forwarding module 21 in alternative embodiments of the present invention.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for remotely routing a voice call forwarded to a first telematic device as facilitated by a call state of the voice call, said method comprising:

maintaining the call state of the voice call in response to an answering by the first telematic device of one or more call forwarding rings indicative of the voice call; and forwarding the voice call to either a voice mail module, a second telematic device or a telecommunication device as facilitated by the maintaining of the call state in response to a failure of a user of the first telematic device to answer one or more fake rings indicative of the answering of the one or more call forwarding rings by the first telematic device.

2. The method of claim 1, further comprising:

monitoring ring back tones provided by the first telematic device in response to answering the one or more call forwarding rings, wherein the voice call is forwarded to either the voice mail module, the second telematic device or the telecommunication device as facilitated by the maintaining of the call state in response to a failure of a user of the first telematic device to answer the one or more fake rings after a prescribed number of ring back tones.

3. The method of claim 1, further comprising:

initiating a timer in response to the answering of the one or more call forwarding rings by the first telematic device, wherein the voice call is forwarded to either the voice mail module, the second telematic device or the telecommunication device as facilitated by the maintaining of the call state in response to the first telematic device dropping the voice call within a prescribed timer window.

4. The method of claim 1, further comprising:

providing an announcement to a caller of the voice call, the announcement indicating the forwarding of the voice call to the first telematic device.

5. The method of claim 1, further comprising:

playing music for a caller of the voice call while maintaining the call state of the voice call.

6. The method of claim 1, further comprising:

running an advertisement for a caller of the voice call while maintaining the call state of the voice call.

7. A method for remotely routing a voice call forwarded to a first telematic device as facilitated by a call state of the voice call, said method comprising:

maintaining the call state of the voice call in response to an answering by the first telematic device of one or more call forwarding rings indicative of the voice call;

monitoring ring back tones provided by the first telematic device in response to answering the one or more call forwarding rings; and forwarding the voice call to either a voice mail module, a second telematic device or a telecommunication device as facilitated by the maintaining of the call state in response to a failure after a prescribed number of ring back tones of a user of the first telematic device to answer one or more fake rings indicative of the answering of the one or more call forwarding rings by the first telematic device.

8. A device, comprising:

a call forwarding module operable to forward a voice call to a first telematic device as facilitated by a call state of the voice call; and a voice portal operable to maintain the call state of the voice call in response to an answering by the first telematic device of one or more call forwarding rings indicative of the voice call, said voice portal further operable to forward the voice call to either a voice mail module, a second telematic device or a telecommunication device as facilitated by a maintaining of the call state in response to a failure of a user of the first telematic device to answer one or more fake rings indicative of the answering of the one or more call forwarding rings by the first telematic device.

9. The device of claim 8, wherein:

said voice portal is further operable to monitor ring back tones provided by the first telematic device in response to answering the one or more call forwarding rings; and said voice portal forwards the voice call to either the voice mail module, the second telematic device or the telecommunication device as facilitated by the maintaining of the call state in response to a failure of a user of the first telematic device to answer the one or more fake rings after a prescribed number of ring back tones.

10. The device of claim 8, wherein:

said voice portal is further operable to initiate a timer in response to the answering of the one or more call forwarding rings by the first telematic device; and said voice portal forwards the voice call to either the voice mail module, the second telematic device or the telecommunication device as facilitated by the maintaining of the call state in response to the first telematic device dropping the voice call within a prescribed timer window.

11. The device of claim 8, wherein:

said voice portal is further operable to provide an announcement to a caller of the voice call, the announcement indicating the forwarding of the voice call to the first telematic device.

12. The device of claim 8, wherein:

said voice portal is further operable to play music for a caller of the voice call while maintaining the call state of the voice call.

13. The device of claim 8, wherein:

said voice portal is further operable to run an advertisement for a caller of the voice call while maintaining the call state of the voice call.

14. A device, comprising:

a call forwarding operable to forward a voice call to a first telematic device as facilitated by a call state of the voice call; and a voice portal operable to maintain the call state of the voice call in response to an answering by the first telematic device of one or more call forwarding rings indicative of the voice call,
    wherein said voice portal is further operable to monitor ring back tones provided by the first telematic device in response to answering the one or more call forwarding rings, and
    wherein said voice portal is further operable to forward the voice call to either a voice mail module, a second telematic device or a telecommunication device as facilitated by a maintaining of the call state in response to a failure after a prescribed number of ring back tones of a user of the first telematic device to answer one or more fake rings indicative of the answering of the one or more call forwarding rings by the first telematic device.

15. A device, comprising:

means for maintaining a call state of the voice call in response to an answering by the first telematic device of one or more call forwarding rings indicative of the voice call; and means for forwarding the voice call to either a voice mail module, a second telematic device or a telecommunication device as facilitated by the maintaining of the call state in response to a failure of a user of the first telematic device to answer one or more fake rings indicative of the answering of the one or more call forwarding rings by the first telematic device.

16. A device, comprising:

means for maintaining a call state of the voice call in response to an answering by the first telematic device of one or more call forwarding rings indicative of the voice call;

means for monitoring ring back tones provided by the first telematic device in response to answering the one or more call forwarding rings; and means for forwarding the voice call to either a voice mail module, a second telematic device or a telecommunication device as facilitated by the maintaining of the call state in response to a failure after a prescribed number of ring back tones of a user of the first telematic device to answer one or more fake rings indicative the answering by the first telematic device of the one or more call forwarding rings indicative of the voice call.

* * * * *